No. 777,768. PATENTED DEC. 20, 1904.
R. B. AYRES.
TIRE SHIELD.
APPLICATION FILED DEC. 10, 1903.
NO MODEL.
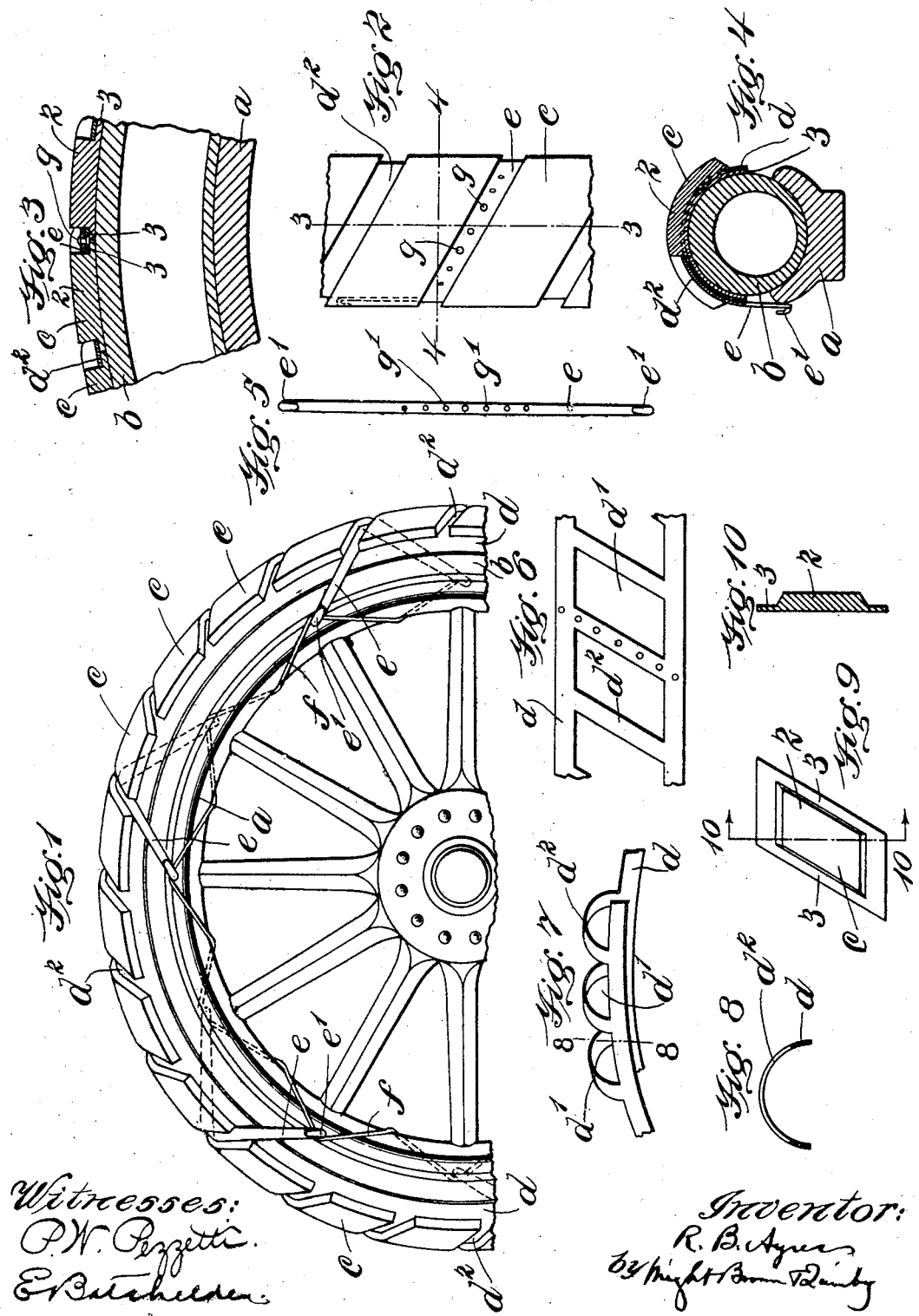
Witnesses:
Inventor:
R. B. Ayres
Attys:

No. 777,768.

Patented December 20, 1904.

UNITED STATES PATENT OFFICE.

REUBEN B. AYRES, OF EAST ORANGE, NEW JERSEY.

TIRE-SHIELD.

SPECIFICATION forming part of Letters Patent No. 777,768, dated December 20, 1904.

Application filed December 10, 1903. Serial No. 184,512.

*To all whom it may concern:*

Be it known that I, REUBEN B. AYRES, of East Orange, in the county of Essex and State of New Jersey, have invented certain new and useful Improvements in Tire-Shields, of which the following is a specification.

This invention has for its object to provide an elastic shield adapted to be detachably secured to the pneumatic tire of an automobile or other vehicle in order that the tire may be provided with a reinforced tread which can be renewed from time to time when worn and which will preserve the body or air-cushioned portion of the tire, so that the latter will not require as frequent renewal as heretofore.

The invention consists in a detachable elastic tire-shield formed to fit the outer surface of a pneumatic tire and provided with means for detachable connection with the tire, the said shield when in place operating to thicken or reinforce the outer portion of the tire without detracting from its elasticity and being readily detachable and renewable, so that wear of the tread-surface may be compensated for by removing the shield, which constitutes a relatively small part of the complete tire and renewing said tread-surface or shield, this being effected at a relatively small expense.

The invention also consists in certain other improvements incidental to the general purposes of my invention, all of which I will now proceed to describe and claim.

Of the accompanying drawings, forming a part of this specification, Figure 1 represents a side elevation of a vehicle-wheel having a pneumatic tire which is provided with a shield embodying my invention. Fig. 2 represents a plan view of a portion of the complete wheel looking toward the edge thereof. Fig. 3 represents a section on line 3 3 of Fig. 2. Fig. 4 represents a section on line 4 4 of Fig. 2. Fig. 5 represents a plan view of one of the elastic clamps employed to secure the shield to the wheel-rim and tire. Fig. 6 represents a plan view of a portion of one of the shield-securing members. Fig. 7 represents an edge view of the member shown in Fig. 6. Fig. 8 represents a section on line 8 8 of Fig. 7. Fig. 9 represents a plan view of one of the sections of which the shield may be composed. Fig. 10 represents a section on line 10 10 of Fig. 9.

The same reference characters indicate the same parts in all the figures.

In the drawings, $a$ represents a wheel-rim, which may be of any suitable construction and is formed externally to receive a pneumatic tire $b$, which may also be of any suitable or desired construction and is preferably adapted to be inflated. I do not show the means for inflating the tire, as means for this purpose are well known and require no illustration. The wheel-rim and the tire in itself form no part of my invention, and these parts may be of any suitable construction. In practice it is preferable that the wheel-rim be concave in cross-section at its outer surface in order to receive the inner portion of the tire, as shown in Fig. 4.

In carrying out my invention I provide an elastic shield or reinforcement, which fits the outer surface of the tire and constitutes the tread portion thereof and is detachable from the tire, so that when worn it may be removed and renewed, said reinforcement thickening the tire and preventing the tubular air-cushioned portion thereof from being worn by contact with the surface on which the tire runs.

In the embodiment of my invention shown in Figs. 1 to 9, inclusive, the said shield is composed of a series of sections $c$, which are made in separate and separable parts or pieces and are detachably secured to the tire in a series extending around the periphery of the tire, each section $c$ extending across the outer surface of the tire and constituting a part of the acting face or tread of the tire. The sections $c$ are composed of elastic material, such as vulcanized rubber or a combination of rubber and fabric, and each section preferably comprises a thickened central part 2 and a reduced marginal flange 3, said flange surrounding the central portion 2, the base of each section being adapted to be curved to fit the surface of a pneumatic tire. The sections $c$ are preferably of rhomboidal form in outline, as shown in Fig. 9, so that when assembled on the periphery of a tire $b$, with their bases resting on, and consequently conforming to the curvature of the said tire $b$, the central portions 2 of the sections will be separated from each other by grooves extending transversely or crosswise of the tire and obliquely to the axis of the wheel. This arrangement of the grooves between the acting portions 2 of the shield-sections prevents any jar or jolt, such as would be occasioned if the said grooves extended directly across the tread-surface or substantially parallel with the axis of the wheel. To secure the sections $c$ to the tire, I prefer to employ, first, a clamping-plate or grid $d$, composed, preferably, of sheet metal and having a series of apertures $d'$ formed to receive the thickened portions 2 of the sections $c$ and intermediate obliquely-arranged cross-bars $d^2$, which occupy the grooves between the thickened portions 2 and bear upon the abutting flanges 3 at the bottoms of said grooves. The plate or grid $d$ is formed to surround the tire and is secured to the tire and to the wheel-rim by a series of elastic metal clamps $e$, each of which is formed to extend through one of the oblique grooves and downwardly upon opposite sides of the tire and wheel-rim, the ends of each clamp being preferably provided with hooks $e'$, adapted to engage a lacing-cord $f$, which is passed under the inner side of the wheel-rim from side to side and secures the clamp, as indicated in Fig. 1. If desired, the clamps $e$ may be connected to the portions of the plate or grid $d$ on which they bear by rivets $g$, as shown in Figs. 2 and 3, each clamp being provided with a series of orifices $g'$, as shown in Fig. 5, to receive said rivets.

The plate or grid $d$ may be of sufficient length to extend entirely around the tire, or it may be made in two or more sections. When the elastic sections $c$ of the shield have become worn, they may be removed by loosening the lacing-cords $f$ and removing the clamps $e$ and plate or grid $d$. Fresh sections $c$ may be then inserted in the orifices of the grid $d$, and the latter may be then replaced upon the wheel and secured in the manner above described.

In applying my invention to a tire it will be advisable to deflate the tire before applying the shield and then inflate the tire after the shield is in place, the inflation of the tire, in connection with the means which connect the shield with the wheel-rim, effecting a secure engagement between the tire, shield, and rim, as will be readily understood.

The grid $d$ may be made of any suitably strong and flexible material, such as sheet metal, rawhide, webbing, &c.

I claim—

1. A detachable tire-shield comprising an elastic tread composed of obliquely-arranged sections formed to fit the outer surface of an elastic tire, and means for detachably connecting said sections upon the outer surface of the tire.

2. A detachable tire-shield comprising an elastic tread formed to fit the outer surface of an elastic tire and provided with transverse grooves in its outer surface, resilient metal clamps formed to enter said grooves, and means for detachably securing the said clamps to a wheel-rim.

3. A detachable tire-shield comprising an elastic tire-tread formed to fit the outer surface of an elastic tire and having tread-sections separated by transverse grooves, flexible metal clamps formed to enter said grooves, and means for securing said clamps to a wheel-rim.

4. A detachable tire-shield comprising a series of elastic tread-sections, formed to fit the outer surface of an elastic tire, each section having a thickened central portion and edge flanges, a flexible skeleton plate or grid having openings conforming to the thickened portions of the sections, and means for securing said plate to a wheel-rim.

5. As a means for securing a detachable elastic tire-tread, a flexible plate or grid having openings to receive portions of the elastic tread, the portions of the grid between the openings being obliquely arranged, for the purpose described.

6. As an article of manufacture, an elastic tread-section of rhomboidal form in outline and formed to fit the outer surface of an elastic tire, said section being composed of a thickened central portion and a reduced marginal portion extending around the four sides or edges, the base of said section being adapted to be curved to fit the outer surface of a pneumatic tire.

In testimony whereof I have affixed my signature in presence of two witnesses.

REUBEN B. AYRES.

Witnesses:
C. F. BROWN,
E. BATCHELDER.